(12) United States Patent
Aloisio et al.

(10) Patent No.: US 11,503,064 B1
(45) Date of Patent: *Nov. 15, 2022

(54) ALERT SYSTEMS AND METHODS FOR ATTACK-RELATED EVENTS

(71) Applicant: ARCHITECTURE TECHNOLOGY CORPORATION, Eden Prairie, MN (US)

(72) Inventors: Scott Aloisio, Ithaca, NY (US); Robert Joyce, Ithaca, NY (US); Judson Powers, Ithaca, NY (US)

(73) Assignee: ARCHITECTURE TECHNOLOGY CORPORATION, Eden Prairie, MN (US)

(*) Notice: Subject to any disclaimer, the term of this patent is extended or adjusted under 35 U.S.C. 154(b) by 148 days.

This patent is subject to a terminal disclaimer.

(21) Appl. No.: 16/995,458

(22) Filed: Aug. 17, 2020

Related U.S. Application Data

(63) Continuation of application No. 16/012,651, filed on Jun. 19, 2018, now Pat. No. 10,749,890.

(51) Int. Cl.
*H04L 29/06* (2006.01)
*H04L 9/40* (2022.01)
(Continued)

(52) U.S. Cl.
CPC ......... *H04L 63/1433* (2013.01); *G06N 5/025* (2013.01); *H04L 41/0636* (2013.01);
(Continued)

(58) Field of Classification Search
CPC . H04L 63/1433; H04L 41/0636; H04L 41/22; H04L 43/06; H04L 63/1416; H04L 63/302; G06N 5/025
See application file for complete search history.

(56) References Cited

U.S. PATENT DOCUMENTS

| 4,895,518 A | 1/1990 | Arnold et al. |
| 5,115,433 A | 5/1992 | Baran et al. |

(Continued)

FOREIGN PATENT DOCUMENTS

| CN | 106709613 A | 5/2017 |
| WO | WO-02/071192 A2 | 9/2002 |
| WO | WO-2017/105383 A1 | 6/2017 |

OTHER PUBLICATIONS

Ingoldsby, Terrance R. "Attack tree-based threat risk analysis." Amenaza Technologies Limited (2010): 3-9. (Year: 2010).*

(Continued)

*Primary Examiner* — Shawnchoy Rahman
(74) *Attorney, Agent, or Firm* — Foley & Lardner LLP

(57) ABSTRACT

Disclosed herein are embodiments of systems, methods, and products comprise an analytic server, which provides a SilverlineRT system that prioritizes and analyzes security alerts and events. The server builds an attack tree based on attack detection rules. The server monitors large-scale distributed systems and receives alerts from various devices. The server determines attacks using the attack tree while excluding false alarms. The server determines impact and risk metrics for attacks in real-time, and calculates an impact score for each attack. The server ranks and prioritizes the attacks based on the impact scores. The server also generates real-time reports. By consider the mission and system specific context in the analysis alert information, the server gives insight into the overall context of problems and potential solutions, improving decision-making. By showing the impacts of alters, the server allows security personnel to prioritize responses and focus on highest value defense activities.

18 Claims, 5 Drawing Sheets

(51) Int. Cl.
*H04L 41/0631* (2022.01)
*H04L 41/22* (2022.01)
*H04L 43/06* (2022.01)
*G06N 5/02* (2006.01)

(52) U.S. Cl.
CPC ............. *H04L 41/22* (2013.01); *H04L 43/06* (2013.01); *H04L 63/1416* (2013.01); *H04L 63/302* (2013.01)

(56) References Cited

U.S. PATENT DOCUMENTS

| | | |
|---|---|---|
| 5,440,723 A | 8/1995 | Arnold et al. |
| 5,601,432 A | 2/1997 | Bergman |
| 5,944,783 A | 8/1999 | Nieten |
| 5,974,549 A | 10/1999 | Golan |
| 5,974,579 A | 10/1999 | Lepejian et al. |
| 6,088,804 A | 7/2000 | Hill et al. |
| 6,345,283 B1 | 2/2002 | Anderson |
| 6,658,481 B1 | 12/2003 | Basso et al. |
| 6,985,476 B1 | 1/2006 | Elliott et al. |
| 7,058,968 B2 | 6/2006 | Rowland et al. |
| 7,107,347 B1 | 9/2006 | Cohen |
| 7,228,566 B2 | 6/2007 | Caceres et al. |
| 7,234,168 B2 | 6/2007 | Gupta et al. |
| 7,317,733 B1 | 1/2008 | Olsson et al. |
| 7,325,252 B2 | 1/2008 | Bunker et al. |
| 7,372,809 B2 | 5/2008 | Chen et al. |
| 7,496,959 B2 | 2/2009 | Adelstein et al. |
| 7,522,908 B2 | 4/2009 | Hrastar |
| 7,694,328 B2 | 4/2010 | Joshi et al. |
| 7,743,074 B1 | 6/2010 | Parupudi et al. |
| 7,748,040 B2 | 6/2010 | Adelstein et al. |
| 7,818,804 B2 | 10/2010 | Marceau |
| 7,886,049 B2 | 2/2011 | Adelstein et al. |
| 7,925,984 B2 | 4/2011 | Awe et al. |
| 7,930,353 B2 | 4/2011 | Chickering et al. |
| 7,962,961 B1 | 6/2011 | Griffin et al. |
| 8,079,080 B2 | 12/2011 | Borders |
| 8,156,483 B2 | 4/2012 | Berg et al. |
| 8,176,557 B2 | 5/2012 | Adelstein et al. |
| 8,250,654 B1 | 8/2012 | Kennedy et al. |
| 8,266,320 B1 | 9/2012 | Bell et al. |
| 8,296,848 B1 | 10/2012 | Griffin et al. |
| 8,307,444 B1 | 11/2012 | Mayer et al. |
| 8,321,437 B2 | 11/2012 | Lim |
| 8,341,732 B2 | 12/2012 | Croft et al. |
| 8,407,801 B2 | 3/2013 | Ikegami et al. |
| 8,433,768 B1 | 4/2013 | Bush et al. |
| 8,458,805 B2 | 6/2013 | Adelstein et al. |
| 8,490,193 B2 | 7/2013 | Sarraute Yamada et al. |
| 8,495,229 B2 | 7/2013 | Kim |
| 8,495,583 B2 * | 7/2013 | Bassin ................ G06F 11/3466 717/124 |
| 8,499,354 B1 | 7/2013 | Satish et al. |
| 8,554,536 B2 | 10/2013 | Adelman et al. |
| 8,862,803 B2 | 10/2014 | Powers et al. |
| 8,893,278 B1 | 11/2014 | Chechik |
| 9,076,342 B2 | 7/2015 | Brueckner et al. |
| 9,081,911 B2 | 7/2015 | Powers et al. |
| 9,083,741 B2 | 7/2015 | Powers |
| 9,137,325 B2 | 9/2015 | Muhunthan et al. |
| 9,197,649 B2 * | 11/2015 | Carvalho ............. H04L 63/126 |
| 9,208,323 B1 | 12/2015 | Karta et al. |
| 9,225,637 B2 | 12/2015 | Ramanujan et al. |
| 9,325,728 B1 | 4/2016 | Kennedy et al. |
| 9,344,445 B2 * | 5/2016 | Burns ................ H04L 63/1416 |
| 9,384,677 B2 | 7/2016 | Brueckner et al. |
| 9,626,414 B2 | 4/2017 | Kanjirathinkal et al. |
| 9,836,598 B2 * | 12/2017 | Iyer ........................ G06Q 10/00 |
| 9,882,912 B2 | 1/2018 | Joo |
| 10,079,850 B1 | 9/2018 | Patil et al. |
| 10,083,624 B2 | 9/2018 | Brueckner et al. |
| 10,223,760 B2 * | 3/2019 | Ananthanpillai ..... G06F 21/552 |
| 10,291,634 B2 | 5/2019 | Arzi et al. |
| 10,291,638 B1 | 5/2019 | Chandana et al. |
| 10,467,419 B1 * | 11/2019 | Youngberg ........... G06F 21/563 |
| 10,540,502 B1 | 1/2020 | Joyce et al. |
| 10,558,809 B1 | 2/2020 | Joyce et al. |
| 10,659,488 B1 * | 5/2020 | Rajasooriya ........ H04L 63/1433 |
| 10,686,811 B1 | 6/2020 | Ehle |
| 10,749,890 B1 | 8/2020 | Aloisio et al. |
| 10,803,766 B1 | 10/2020 | Donovan et al. |
| 10,868,825 B1 | 12/2020 | Dominessy et al. |
| 10,949,338 B1 | 3/2021 | Sirianni et al. |
| 11,063,967 B2 * | 7/2021 | Rego ................... H04L 63/1441 |
| 11,277,203 B1 * | 3/2022 | McLinden ........... H04B 10/516 |
| 2002/0038430 A1 | 3/2002 | Edwards et al. |
| 2002/0073204 A1 | 6/2002 | Dutta et al. |
| 2002/0078382 A1 | 6/2002 | Sheikh et al. |
| 2002/0129264 A1 | 9/2002 | Rowland et al. |
| 2002/0162017 A1 | 10/2002 | Sorkin et al. |
| 2003/0056116 A1 | 3/2003 | Bunker et al. |
| 2003/0182582 A1 | 9/2003 | Park et al. |
| 2003/0236993 A1 | 12/2003 | Mccreight et al. |
| 2004/0039921 A1 | 2/2004 | Chuang |
| 2005/0132225 A1 | 6/2005 | Gearhart |
| 2005/0138413 A1 | 6/2005 | Lippmann et al. |
| 2005/0165834 A1 | 7/2005 | Nadeau et al. |
| 2005/0193173 A1 | 9/2005 | Ring et al. |
| 2005/0193430 A1 | 9/2005 | Cohen et al. |
| 2005/0203921 A1 | 9/2005 | Newman et al. |
| 2006/0037076 A1 | 2/2006 | Roy |
| 2006/0104288 A1 | 5/2006 | Yim et al. |
| 2006/0109793 A1 | 5/2006 | Kim et al. |
| 2006/0167855 A1 | 7/2006 | Ishikawa et al. |
| 2006/0191010 A1 | 8/2006 | Benjamin |
| 2006/0248525 A1 | 11/2006 | Hopkins |
| 2006/0253906 A1 | 11/2006 | Rubin et al. |
| 2006/0271345 A1 | 11/2006 | Kasuya |
| 2007/0055766 A1 | 3/2007 | Petropoulakis et al. |
| 2007/0112714 A1 | 5/2007 | Fairweather |
| 2007/0192863 A1 | 8/2007 | Kapoor et al. |
| 2008/0010225 A1 | 1/2008 | Gonsalves et al. |
| 2008/0167920 A1 | 7/2008 | Schmidt et al. |
| 2008/0183520 A1 | 7/2008 | Cutts et al. |
| 2008/0222734 A1 | 9/2008 | Redlich et al. |
| 2009/0007270 A1 | 1/2009 | Futoransky et al. |
| 2009/0144827 A1 | 6/2009 | Peinado et al. |
| 2009/0150998 A1 | 6/2009 | Adelstein et al. |
| 2009/0158430 A1 | 6/2009 | Borders |
| 2009/0164522 A1 | 6/2009 | Fahey |
| 2009/0208910 A1 | 8/2009 | Brueckner et al. |
| 2009/0254572 A1 | 10/2009 | Redlich et al. |
| 2009/0288164 A1 | 11/2009 | Adelstein et al. |
| 2009/0319247 A1 | 12/2009 | Ratcliffe et al. |
| 2009/0319249 A1 | 12/2009 | White et al. |
| 2009/0319647 A1 | 12/2009 | White et al. |
| 2009/0319906 A1 | 12/2009 | White et al. |
| 2009/0320137 A1 | 12/2009 | White et al. |
| 2009/0328033 A1 | 12/2009 | Kohavi et al. |
| 2010/0010968 A1 | 1/2010 | Redlich et al. |
| 2010/0058114 A1 | 3/2010 | Perkins et al. |
| 2010/0082513 A1 | 4/2010 | Liu |
| 2010/0146615 A1 | 6/2010 | Locasto et al. |
| 2010/0284282 A1 | 11/2010 | Golic |
| 2010/0319069 A1 | 12/2010 | Granstedt et al. |
| 2011/0154471 A1 | 6/2011 | Anderson et al. |
| 2011/0177480 A1 | 7/2011 | Menon et al. |
| 2011/0282715 A1 | 11/2011 | Nguyen et al. |
| 2012/0210017 A1 | 8/2012 | Muhunthan et al. |
| 2012/0210427 A1 | 8/2012 | Bronner et al. |
| 2013/0014264 A1 | 1/2013 | Kennedy et al. |
| 2013/0019312 A1 | 1/2013 | Bell et al. |
| 2013/0055404 A1 | 2/2013 | Khalili |
| 2013/0191919 A1 * | 7/2013 | Basavapatna ........... H04L 63/20 726/25 |
| 2013/0347085 A1 | 12/2013 | Hawthorn et al. |
| 2013/0347116 A1 | 12/2013 | Flores et al. |
| 2014/0046645 A1 | 2/2014 | White et al. |
| 2014/0099622 A1 | 4/2014 | Arnold et al. |
| 2014/0137257 A1 * | 5/2014 | Martinez ............ H04L 63/1433 726/25 |
| 2014/0287383 A1 | 9/2014 | Willingham et al. |

(56) References Cited

U.S. PATENT DOCUMENTS

| | | | |
|---|---|---|---|
| 2014/0321735 | A1 | 10/2014 | Zhang et al. |
| 2014/0337971 | A1 | 11/2014 | Casassa Mont et al. |
| 2015/0033346 | A1* | 1/2015 | Hebert .................. G06F 21/577 726/25 |
| 2015/0050623 | A1 | 2/2015 | Falash et al. |
| 2015/0106324 | A1 | 4/2015 | Puri et al. |
| 2015/0193695 | A1 | 7/2015 | Cruz Mota et al. |
| 2015/0213260 | A1 | 7/2015 | Park |
| 2015/0213730 | A1 | 7/2015 | Brueckner et al. |
| 2015/0269383 | A1* | 9/2015 | Lang ....................... H04L 63/20 726/1 |
| 2015/0339477 | A1 | 11/2015 | Abrams et al. |
| 2016/0028764 | A1 | 1/2016 | Vasseur et al. |
| 2016/0099953 | A1 | 4/2016 | Hebert et al. |
| 2016/0173495 | A1 | 6/2016 | Joo |
| 2016/0188814 | A1 | 6/2016 | Raghavan et al. |
| 2016/0219024 | A1 | 7/2016 | Verzun et al. |
| 2016/0234242 | A1 | 8/2016 | Knapp et al. |
| 2016/0246662 | A1 | 8/2016 | Meng et al. |
| 2016/0307199 | A1 | 10/2016 | Patel et al. |
| 2016/0330228 | A1 | 11/2016 | Knapp et al. |
| 2017/0032694 | A1 | 2/2017 | Brueckner et al. |
| 2017/0032695 | A1 | 2/2017 | Brueckner et al. |
| 2017/0104778 | A1 | 4/2017 | Shabtai et al. |
| 2017/0171230 | A1 | 6/2017 | Leiderfarb et al. |
| 2018/0048534 | A1 | 2/2018 | Banga et al. |
| 2018/0068244 | A1 | 3/2018 | Vashistha |
| 2018/0121657 | A1 | 5/2018 | Hay et al. |
| 2018/0129805 | A1 | 5/2018 | Samuel |
| 2018/0150554 | A1 | 5/2018 | Le et al. |
| 2018/0159894 | A1 | 6/2018 | Reddy et al. |
| 2018/0191770 | A1 | 7/2018 | Nachenberg et al. |
| 2018/0219887 | A1 | 8/2018 | Luo et al. |
| 2018/0225471 | A1 | 8/2018 | Goyal et al. |
| 2018/0295154 | A1 | 10/2018 | Crabtree et al. |
| 2018/0367563 | A1 | 12/2018 | Pfleger de Aguiar et al. |
| 2018/0375892 | A1 | 12/2018 | Ganor |
| 2019/0014153 | A1 | 1/2019 | Lang et al. |
| 2019/0083876 | A1 | 3/2019 | Morton et al. |
| 2019/0102564 | A1 | 4/2019 | Li et al. |
| 2019/0164015 | A1 | 5/2019 | Jones, Jr. et al. |
| 2019/0188615 | A1 | 6/2019 | Liu |
| 2019/0222593 | A1 | 7/2019 | Craig et al. |
| 2019/0258953 | A1 | 8/2019 | Lang et al. |
| 2019/0289029 | A1 | 9/2019 | Chawla et al. |
| 2019/0312890 | A1 | 10/2019 | Perilli |
| 2019/0356684 | A1 | 11/2019 | Sinha et al. |
| 2019/0370473 | A1 | 12/2019 | Matrosov et al. |
| 2020/0050770 | A1* | 2/2020 | Inagaki ................. G06F 3/0484 |
| 2020/0184053 | A1 | 6/2020 | Kursun |
| 2020/0201992 | A1 | 6/2020 | Hadar et al. |
| 2020/0358803 | A1 | 11/2020 | Roelofs et al. |
| 2021/0168170 | A1 | 6/2021 | Asai et al. |

OTHER PUBLICATIONS

Li, XiaoHong, et al. "Unified threat model for analyzing and evaluating software threats." Security and Communication Networks 7.10 (2014): 1454-1466. (Year: 2014).*
"CYDEST: CYber DEfense Simulation Trainer", Air Force SBIR/STTR Award Details, Phase I, Award Details Status: Completed (Invited for Phase II) Start: Apr. 13, 2005 End Jan. 13, 2006, retrieved on Aug. 30, 2020 from URL: http://www.itfsbirsttr.com/award/AWARDDetails.aspx?pk=12036 (2 pages).
Arcnitecture Technology Corporation et al.", Cydest (Cyber Defense Simulation Trainer)," http://web.archive.org/web/20061107010247/www.atcorp.com/securesystems/cydest.html, Dec. 2005, 1 page.
ATC-NY et al.,"Cyber Defense Simulation Trainer (CYDEST)", CYDEST Congressional Briefing, Feb. 19, 2007, 1 page.
ATC-NY, SB172-007, D172-007-0014, Phase I SBIR Proposal, Silverline Human Performance Detection (Silverline-HPD), Jul. 20, 2017 (17 pages).
Bergstromb et al., "The Distributed Open Network Emulator: Using Relativistic Time for Distributed Scalable Simulation", Proceedings of the 20th Workshop on Principles of Advanced and Distributed Simulation, May 23-26, 2006, 7 pages.
Brueckner et al., "CYDEST Cyber Defense Simulation Trainer", ATC-NY a subsidiary of Architecture Technology Corporation, Oct. 29, 2007, 20 pages.
Carson et al., "NIST NET: A Linux-based network emulation tool" ACM SIGCOMM, Computer Communication Review, vol. 33, Issue 3, Jul. 2003, 16 pages.
Carver et al., "Military Academy Attack/Defense Network", IEEE Systems, Man, and Cybernetics Information Assurance and Security Workshop, West Point, NY, Jun. 17-19, 2002, 6 pages.
Crumb, Francis L., "Cyber Security Boot Camp graduates Class of '06", Academy Spirit, vol. 46, No. 33, Aug. 18, 2006, U.S. Air Force Academy, Colorado (1 page).
Crumb, Francis L., "Hackfest Highlights Cyber Security Boot Camp", Air Force Research Laboratory (AFRL) Information Directorate document, Oct./Nov. 2004 (1 page).
Davoli, "Virtual Square: all the virtuality you always wanted but you were afraid to ask," http://virtualsguare.org/copyright Renzo Davoli, May 27, 2004, 3 pages.
Davoli, "Virtual Square", Proceedings of the First International Conference on Open Source Systems, Genova, Jul. 11-15, 2005, 6 pages.
Duggirala et al., "Open Network Emulator", Jan. 15, 2005, available at URL: https://web.archive.org/web/2010*/http://csrl.cs.vt.edu/net_emulation.html (5 pages).
Edwards et al., "Hajime: Analysis of a decentralized internet worm for IoT devices", RapidityNetworks, Security Research Group, Oct. 16, 2016, pp. 1-18.
Home Invasion 2.0, "Attacking Network-Connected Embedded Devices", retrieved from the internet on Jun. 20, 2018, https://media.blackhat.com/us-13/US-13-Crowley-Home-lnvasion-2-0-WP.pdf, 15 pages.
Honeynet Project, "Know Your Enemy: Defining Virtual Honeynets," http://old.honeynel.org/papers.virtual/, Jan. 27, 2003, 7 pages.
Howard et al., "A Common Language for Computer Security Incidents," Sandia National Laboratories Report, SAND9B 8667, Oct. 1998, 32 pages.
Keshav, "REAL: A Network Simulator," Computer Science Division, Department of Electrical Engineering and Computer Science, University of California, Berkeley, Dec. 1988, 16 pages.
Kimball, "Silverline Human Performance Detection (Silverline-HPD)", Phase 1 SBIR Proposal, Architecture Technology Corporation, SB172-007, D172-007-0014, Jul. 20, 2017, 17 pages.
Krishna et al., "V-Netlab: A Cost-Effective Platform to Support Course Projects in Computer Security", Department of Computer Science, Stony Brook University, Jun. 2005, 7 pages.
Lathrop et al., "Information Warfare in the Trenches: Experiences from the Firing Range," U.S. Military Academy, Security education and critical infrastructures, Kluwer Academic Publishers Norwell, MA, USA .copyright, Jun. 23-26, 2003, 21 pages.
Lathrop et al., "Modeling Network Attacks", 12th Conference on Behavior Representation in Modeling and Simulation, 2003, pp. 401-407 (8 pages).
Lathrop et al., "Modeling Network Attacks", 12th Conference on Behavior Representation in Modeling and Simulation, May 2003, pp. 19-26 (8 pages).
Liljenstam et al., "RINSE: "The Real-Time Immersive Network Simulation Environment for Network Security Exercises, Proceedings of the 19th Workshop on Principles of Advanced and Distributed Simulation (PADS), Jun. 2005, 10 pages.
McDonald, Chris, "A Network Specification Language and Execution Environment for Undergraduate Teaching", ACM SIGCSE Bulletin, vol. 23, Issue 1, Mar. 1991, DOI: 10.1145/107005.107012 (10 pages).
McGrath et al., "NetSim: A Distributed Network Simulation to Support Cyber Exercises", Institute for Security Technology Studies, Dartmouth College, Huntsville Simulation Conference, Mar. 9-11, 2004, Huntsville, Alabama, 6 pages.

(56) References Cited

OTHER PUBLICATIONS

McLinden, "Segmented Attack Prevention System for IoT Networks (SAPSIN)", Abstract-SBIR Phase 1 Proposal, DoD SBIR 2017.2, Proposal No. F172-D12-0184, Topic No. OSD172-D12, 1 page (undated).
Padman et al., "Design of a Virtual Laboratory for Information Assurance Education and Research", Proceedings of the 2002 IEEE, Workshop on Information Assurance and Security, U.S. Military Academy, West Point, Jun. 2002, 7 pages.
Proposal Author: Matthew Donovan; Topic Name and No. N182-131: Red Team in a Box for Embedded and Non-IP Devices; Title: Automated Cyber Evaluation System, Jun. 30, 2018, 24 pages.
Saic et al., "TeamDefend, A White Paper on Strengthening the Weakest Link: Organizational Cyber Defense Training", 17th Annual FIRST Conference, Jun. 26-Jul. 1, 2005, 6 pages.
Saunders, "Simulation Approaches in Information Security Education", Proceedings of the Sixth National Colloquium for Information Systems Security Education, Redmond, Washington, Jun. 4-6, 2002, 15 pages.
Schafer et al., "The IWAR Range: A Laboratory for Undergraduate Information Assurance Education", Military Academy West Point, NY, Research paper, found at http://handle.dtic.mii/100.2/ADM08301, Nov. 7, 2000, 7 pages.
Schepens et al., "The Cyber Defense Exercise: an Evaluation of the Effectiveness of Information Assurance Education", 2003, 14 pages.
Stumpf et al., "NoSE-building virtual honeynets made easy", Darmstadt University of Technology, Department of Computer Science, D-64289 Darmstadt, Germany, 2005, 11 pages.
Stytz et al., "Realistic and Affordable Cyberware Opponents for the Information Warfare BattleSpace," Jun. 2003, 42 pages.
Varga, "The OMNeT ++ Discrete Event Simulation System", Department of Telecommunications, Budapest University of Technology and Economics, Proceedings of the European Simulation Multiconference, Jun. 2001, 7 pages.
Vrable et al., "Scalability, Fidelity, and Containment in the Potemkin Virtual Honeyfarm," SOSP, Oct. 23-26, 2005, 15 pages.
Wang et al., "The design and implementation of the NCTUns 1.0 network simulator", Computer Networks, vol. 42, Issue 2, Jun. 2003, 23 pages.
White et al., "Cyber Security Exercises: Testing an Organization's Ability to Prevent, Detect and Respond to Cyber Security Events," Proceeding of the 37th Hawaii International Conference on System Sciences, Jan. 2004, 10 pages.
Xie et al., "Security Analysis on Cyber-Physical System Using Attack Tree", 2013 Ninth International Conference on Intelligent Information Hiding and Multimedia Signal Processing, IEEE Computer Society, IEEE, 2013, pp. 429-432, DOI: 10.1109/IIH-MSP.2013.113 (4 pages).
Xu et al., "A Minimum Defense Cost Calculation Method for Cyber Physical System", 2019 Seventh International Conference on Advanced Cloud and Big Data (CBD), IEEE, 2019, pp. 192-197, DOI: 10.1109/CBD.2019.00043 (6 pages).
Zeng et al., "GloMoSim: A Library for Parallel Simulation of Large-scale Wireless Networks" ACM SIGSIM Simulation Digest, vol. 28, Issue 1, Jul. 1998, 8 pages.
"Cybersecurity," U.S. Department of Defense Instruction, No. 8500.01, Mar. 14, 2014, 58 pages,accessible via.https://www.esd.whs.mil/Portals/54/Documents/DD/issuances/dodi/850001_2014.pdf.
"Cyberspace Operations," U.S. Air Force, Air Force Policy Directive 10-17, accessible via https://1as.org/irp/doddir/usaf/afpd10-17.pdf, Jul. 31, 2012, 9 pages.
C.M.U. Entertainment Technology Center, "CyberSecurity", found at http://www.etc.cmu.edu/projects/cybersecurity/, Feb. 2000, 16 pages.
De Gusmao et al., "Abstract of Cybersecurity risk analysis model using fault tree analysis and fuzzy decision theory", 2018, International Journal of Information Management, pp. 1-3.
Quinlan et al., "Rose User Manual: A Tool for Building Source-to-Source Translators", Draft User Manual, Version D.9.6a, Lawrence Livermore National Laboratory, Dec. 16, 2015, 337 pages.
Richard III, Golden G., "Memory Analysis, Meet GPU Malware", CERIAS, Oct. 22, 2014, retrieved 2021 from URL: https://www.cerias.purdue.edu/news_and_events/events/security_seminar/details/index/popenihmencsf2v5mggg5ulfd4 (3 pages).
Schneier, "Attack Trees-Schneier on Security", Dr. Dobb's Journal, Dec. 1999, Retrieved from https://www.schneier.com/academic/archives/1999/12/attack_trees.html, 9 pages.
Wikipedia-OpenCL, Mar. 29, 2017, Retrieved from https://en.wikipedia.org/wiki/OpenCL, 23 pages.
2015 DFRWS Forensics Challenge-Submitted Solutions and Source Code Released, Retrieved from http://www.cs.uno.edu/-golden/gpumalware-research.html, 5 pages.
ATC-NY, OSD172-D11, F172-D11-0024, Phase 1 SBIR Proposal, "SilverlineRT", Jul. 20, 2017, 16 pages.
Atighetchi et al., "Metrinome-Continuous Monitoring and Security Validation of Distributed Systems", Journal of Cyber Security and Information Systems vol. II, No. 1: Knowledge Management, Mar. 2014, 8 pgs.
Baloch et al., "Comparative Study of Risk Management in Centralized and Distributed Software Development Environment", Sci. Int.(Lahore), vol. 26, No. 4, 1523-1528, 2014, 6 pages.
Balzarotti et al.,"The impact of GPU-assisted malware on memory forensics: A case study", DFRWS 2015, 9 pgs.
Becker et al., "Applying Game Theory to Analyze Attacks and Defenses in Virtual Coordinate Systems," 41$^{st}$ International Conference on Dependable Systems & Networks (DSN), Jun. 2011, 12 pages.
Challagulla et al., "Empirical Assessment of Machine Learning based Software Defect Prediction Techniques", Proceedings of the 10th IEEE International Workshop on Object-Oriented Real-Time Dependable Systems (WORDS'05), Feb. 2-4, 2005, 8 pages.
Cybersecurity, U.S. Department of Defense Instruction, No. 8500.01, Mar. 14, 2014, 59 pp, accessible via https://www.esd.whs.mil/Portals/54/Documents/DD/issuances/dodi/850001_2014.pdf.
Cyberspace Operations, U.S. Air Force, Air Force Policy Directive 10-17, Jul. 31, 2012, 9 pp, accessible via https://fas.org/irp/doddir/usaf/afpd 10-17.pdf.
Fisher, "Developing Software in a Multicore & Multiprocessor World," Klocwork.com., while paper, Sep. 2010, 9 pages.
Jones, "Software Defect Origins and Removal Methods," International Function Point Users Group, Dec. 28, 2012, 31 pages.
Joyce et al., "MEGA: A Tool for Mac Os X Operating System and Application Forensics," Proceedings of the Digital Forensic Research Conference, Aug. 11-13, 2008, 8 pages.
Libicki, "Cyberdeterrence and Cyberwar," Rand Corporation, 2009, 240 pages.
Maciel, et al. "Impact of a DDoS attack on computer systems: An approach based on an attack tree model," 2018 Annual IEEE International Systems Conference (SysCon), Vancouver, BC, 2018, pp. 1-8.
McHale, "The Aegis Combat System's continuous modernization", Military Embedded Systems, Retrieved from http://mil-Embedded.com/articles/the-aegis-combat-systems-continuous-modernization/, Aug. 26, 2016, 8 pages.
Porche III et al., "A Cyberworm that Knows no Boundaries", RAND Corporation, 2011, 55 pages.
PR Newswire, "ATCorp Releases CSAS-Cloud Security Analysis Suite for Applications in the Cloud", Feb. 26, 2016, 4 pages.
Quinlan et al., "ROSE User Manual: A Tool for Building Source-To-Source Translators," Draft User Manual, Version 0.9.6a, Lawrence Livermore National Laboratory, Dec. 16, 2015, 339 pp.
Rahman et al., "Defect Management Life Cycle Process for Software Quality Improvement," World Academy of Science, Engineering and Technology International Journal of Computer and Information Engineering, vol. 9, No. 12, Nov. 24, 2015, 4 pages.
Richard, "Memory Analysis, meet GPU Malware", Oct. 22, 2014, CERIAS, Retrieved from http://www.cerias.purdue.edu/news_and_events/events/security_seminar/details/index/popenihmencsf2v5mggg5ulfd4, 2 pgs.
Robbio, "How will AI Impact Software Development?" Forbes Technology Council, Aug. 31, 2017, 16 pages.
Rose: Main Page, Retrieved from http://rosecompiler.org/ROSE_HTML_Reference/, Mar. 29, 2017, 3 pages.

(56) References Cited

OTHER PUBLICATIONS

Schneier, "Attack Trees-Schneier on Security", Dr. Cobb's Journal, Dec. 1999, Retrieved from https://www.schneier.com/academic/archives/1999/12/attack_trees.html, 9 pgs.

Shiva et al., "Game Theory for Cyber Security," Proceedings of the Sixth Annual Workshop on Cyber Security and Information Intelligence Research, Article No. 34, Apr. 2010, 10 pages.

Sironi et al., "Metronome: Operating System Level Performance Management via Self-Adaptive Computing", DAG 2012, Jun. 3-7, 2012, 10 pages.

Snyder et al., "Ensuring U.S. Air Force Operations During Cyber Attacks Against Combat Support Systems Guidance Where to Focus Mitigation Efforts," RAND Corporation, 2015, 37 pages.

Vasiliadis et al., "GPU-assisted malware", Int. J_ Inf. Secur. (2015), Published Aug. 28, 2014, 9 pages.

Wu et al., "An Attack Modeling Based on Hierarchical Colored Petri Nets", 2008 International Conference on Computerand Electrical Engineering, Phuket, 2008, pp. 918-921.

Xu et al., "Attack identification for software-defined networking based on attack trees and extension innovation methods," 2017 9th IEEE Intl. Conf. on Intelligent Data Acquisition and Advanced Computing Systems: Technology and Applications (IDAACS), Bucharest, 2017, pp. 485-489.

\* cited by examiner

US 11,503,064 B1

ALERT SYSTEMS AND METHODS FOR ATTACK-RELATED EVENTS

CROSS-REFERENCE TO RELATED APPLICATIONS

This application is a continuation application of U.S. application Ser. No. 16/012,651, filed Jun. 19, 2018, entitled "Systems And Methods For Improving The Ranking And Prioritization Of Attack-Related Events," which is hereby incorporated by reference in its entirety.

This application relates to U.S. application Ser. No. 15/485,784, filed Apr. 12, 2017, entitled "Software Assurance System for Runtime Environments," and U.S. application Ser. No. 15/622,434, filed Jun. 14, 2017, entitled "Software Assurance for Heterogeneous Distributed Computing Systems," each of which is hereby incorporated by reference in its entirety.

TECHNICAL FIELD

This application relates generally to methods and systems for improving the ranking and prioritization of attack-related events.

BACKGROUND

High value information technology (IT) assets, such as endpoints, servers, and devices, are under continual attack by well-resources adversaries that can leverage component product and software defects in order to gain control of the assets. The impact of a significant compromise may be catastrophic. Compromise can be due to software bugs, configuration errors, or design flaws—all of which involve low-level technical details and are difficult to ascribe to high-level system services and mission needs. As adversaries probe complex systems, their activities will inevitably be visible in event logs, intrusion detection systems (IDS), and security information and event management (STEM) facilities.

Existing intrusion detection, logging, and security information and event management (SIEM) systems may provide security personnel with a deluge of information. However, much of the information may be either false alarms or activities with minimal impact. Continuous monitoring of an asset's typical behavior including running processes, communications, memory use, and storage may reveal useful anomalous events. However, false positive may be high, and human specialists may still spend considerable time sorting through events to determine the highest value investigations to pursue. It is difficult to see the critical alerts among the unimportant or false ones. Without a considerable reduction in false positives, there is little hope in providing sufficiently automated resolutions. False alarms drain resources and contribute to cognitive overload among analysts, whose time is limited and expensive.

In addition, large numbers of network probes threaten to drown out significant events that require analyst attention and immediate response. Due to lack of automated responses, accurate sensors and personnel, the time required to recognize, diagnose, and act upon events in the commercial sector is in the range of days and hours.

Host-based and network-based intrusion detection systems (IDS) may identify unauthorized, illicit, and anomalous behavior based on agents placed on hosts or upon network traffic. Logs from hosts, servers, firewalls and other devices may also provide an indication of unapproved and irregular activities within the network and on individual devices. Security information and event management technology has been developed and adopted by sectors in the commercial world that supports threat detection through real-time collection and analysis of security events from a wide variety of sensors and events.

Improvements in IDS and STEM technology may gradually reduce false alarm rates, but these systems cannot take overall mission needs and priorities into account. What is needed is a system/mission model that maps high-level concerns to potential low-level vulnerabilities, compromises, or indications of suspicious activity. For enterprise-scale systems, such models can become very complex; a machine-readable model is needed that can perform automated calculations of various metrics (impact, potential for loss of life, remediation cost, etc.). Such a model is also requisite for any type of automated response: it is only by assessing larger impacts that an automated system can make necessary changes without disrupting essential services.

A driver for operating cost effective and secure operation environments may be availability of subject matter experts to monitor highly protected assets. Their labor hours may be a limited resource and the ability to focus their expertise on the highest value defense activities is an important way to most effectively leverage their resources. Therefore, there is a need for tools and means of ranking and prioritizing attack indicators so that their time may be more efficiently spent on the most important threats. Such tools and means may also lead to eventual automation of monitor and response capabilities, and help reduce time for most serious events down to hours/minutes.

SUMMARY

What is therefore desired is to have a system that analyzes and prioritizes the impact of security alerts and security-relevant events on servers, endpoint hosts, and network devices. Embodiments disclosed herein describe a network security alerts analysis system, referred herein as a Silverline Run Time (SliverlineRT) system containing one or more instances of SilverlineRT applications. The SilverlineRT system may solve the aforementioned problems and other problems as well. The SilverlineRT system may consider the overall system architecture and mission goals, giving security analysts critical insight into the impact of potential compromise, triaging less serious events and responding as necessary to more grave ones. The SilverlineRT system may also compute security-relevant metrics for the mission system as a whole, including remediation costs and the impact of particular attacks, should they occur in the future. As a result, the SilverlineRT system may save time while providing more thorough, context-driven analysis and recommendations for manual or automated response—especially of the complex interconnections in typical large-scale mission/enterprise systems.

In one embodiment, a computer implemented method comprises generating, by a computer, an executable logic of an attack tree model based on a set of attack detection rules received by the computer through a graphical user interface (GUI) wherein the attack tree model is in a hierarchical structure comprising a root node and one or more child nodes, the root node representing a higher-level operating condition of an attack, and each of the one or more child nodes representing a lower-level operating condition of the attack; receiving, by the computer in real-time, electronic notifications of a plurality of alerts from a plurality of network devices interconnected to each other within a distributed network; detecting, by the computer, one or more attacks on the plurality of network devices based on the plurality of alerts by executing the logic of the attack tree model, wherein executing the logic of the attack tree model comprises traversing the attack tree model from the one or more child nodes to respective parent node based on the plurality of alerts, wherein the traversing comprises determining that an operating condition of a respective parent node is satisfied based upon the computer determining that the respective operating condition of at least one of the one or more child nodes is satisfied; determining, by the computer, impact and risk metrics for each of the one or more attacks by correlating configuration data of the plurality of network devices; calculating, by the computer, an impact score for each of the one or more attacks based on the corresponding impact and risk metrics; ranking and prioritizing, by the computer, the one or more attacks based on the corresponding impact score; and generating, by the computer in real-time, a dashboard comprising prioritized list of the one or more attacks, whereby the computer automatically responds to one or more higher priority attacks.

In another embodiment, a system comprises a plurality of network devices; a server in communication with the plurality of network devices and configured to: generate an executable logic of an attack tree model based on a set of attack detection rules received by the server through a graphical user interface (GUI), wherein the attack tree model is in a hierarchical structure comprising a root node and one or more child nodes, the root node representing a higher-level operating condition of an attack, and each of the one or more child nodes representing a lower-level operating condition of the attack; receive in real-time electronic notifications of a plurality of alerts from a plurality of network devices interconnected to each other within a distributed network; detect one or more attacks on the plurality of network devices based on the plurality of alerts by executing the logic of the attack tree model, wherein executing the logic of the attack tree model comprises traversing the attack tree model from the one or more child nodes to respective parent node based on the plurality of alerts, wherein the traversing comprises determining that an operating condition of a respective parent node is satisfied based upon the computer determining that the respective operating condition of at least one of the one or more child nodes is satisfied; determine impact and risk metrics for each of the one or more attacks by correlating configuration data of the plurality of network devices; calculate an impact score for each of the one or more attacks based on the corresponding impact and risk metrics; rank and prioritize the one or more attacks based on the corresponding impact score; and generate in real-time a dashboard comprising prioritized list of the one or more attacks, whereby the server automatically responds to one or more higher priority attacks.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
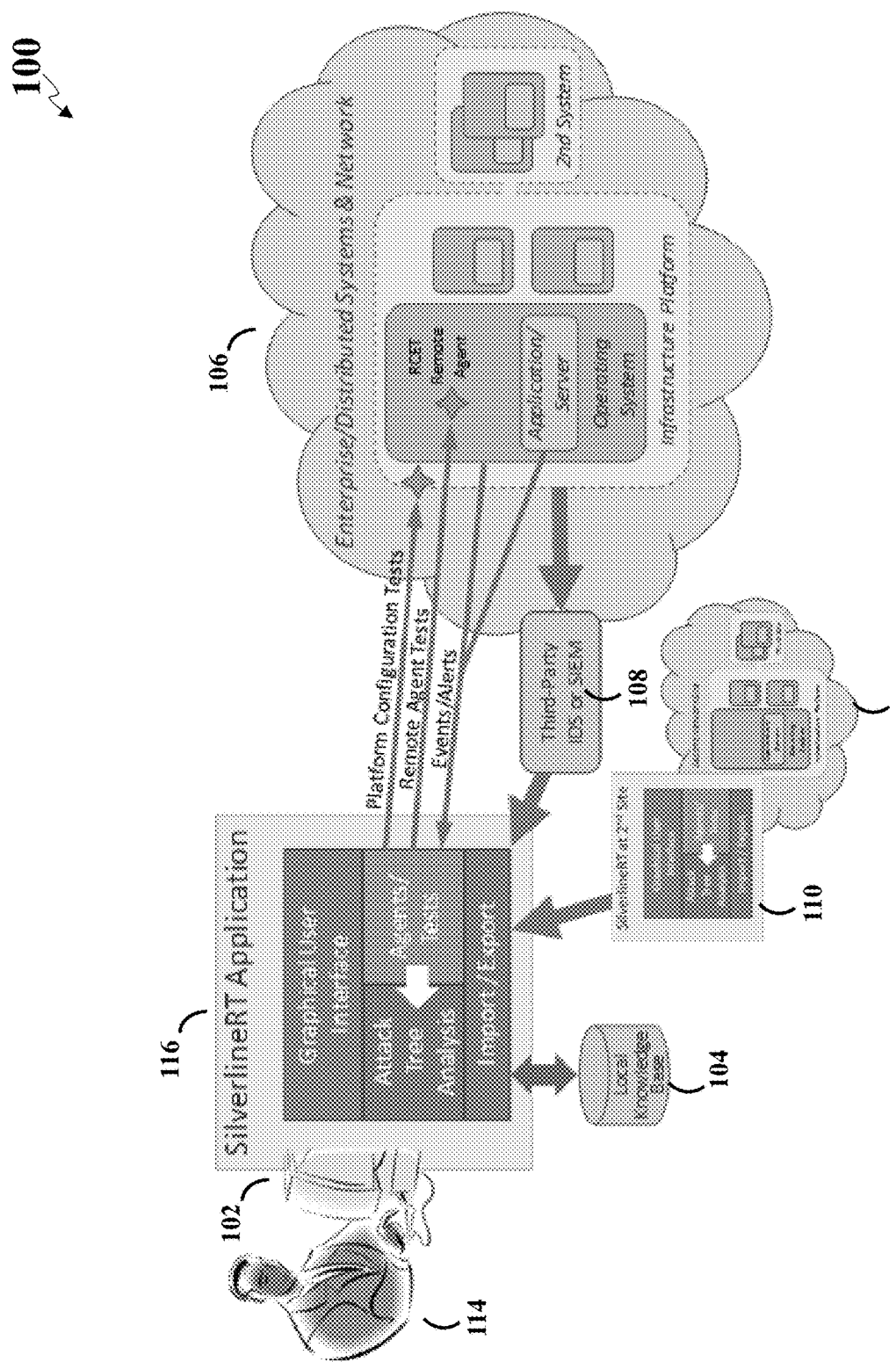
FIG. 1 illustrates a computer system for improving the ranking and prioritization of attack-related events, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe an analytic server that builds SliverlineRT tools that can show the context and impact of potential alerts. By executing SliverlineRT, the analytic server may prioritize and analyze security alerts and server/endpoint/network events according to the overall system architecture and mission goals. By using impact models based on an enhanced version of attack trees, the analytic server may give security personnel visibility into overall impact of alerts and potentially malicious activity, thereby allowing the security personnel to prioritize their response. The analytic server may also pave the way for automated responses that are consistent with overall mission needs and priorities. The analytic server may reduce the security personnel's burden, save time and yield more thorough, repeatable analysis of cyber events. The SilverlineRT system particularly excels in showing the impact of alerts within large-scale distributed systems, both within the air force and department of defense as well as in civilian critical infrastructure and commercial enterprise networks.

The analytic server may use mission- and system-specific context in the analysis and prioritization of alert information, thus giving insight into the overall context of problems and potential solutions, improving decision making and saving time for security personnel.

FIG. 1 illustrates components of a system 100 for improving the ranking and prioritization of attack-related events, according to an embodiment. The system 100 may include an analytic server 102 with a local knowledge database 104, enterprise/distributed systems and network 106, a third party intrusion detection system (IDS) or security information and event management (STEM) system 108, a second analytic server 110 connected with a second network of distributed systems 112. FIG. 1 shows how a SilverlineRT system fits within a multi-site real-time monitoring system. The analytic server and other system devices may be connected via hardware and software components of one or more networks. Examples of the network include, but are not limited to, Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The analytic server 102 may be any computing device comprising a processor and other computing hardware and software components, configured to build a SilverlineRT system containing one or more SilverlineRT applications. The analytic server 102 may be logically and physically organized within the same or different devices or structures, and may be distributed across any number of physical structures and locations (e.g., cabinets, rooms, buildings, cities). The analytic server 102 may execute automated configuration and run-time status queries. At the same time, the analytic server 102 may receive logging and alert information from the servers, endpoints, and network devices under management. For example, the analytic server 102 may receive logging and alert information from the devices in the enterprise/distributed systems and network 106, the second analytic server 110 connected with the second network of distributed systems 112. The analytic server 102 may also query existing IDS and STEM systems for alert data, and receive such data asynchronously from the third party IDS or STEM 108. The logging and alert information collected on each device may be collected via standard protocols such as syslog, Windows Event Logs, secure shell (SSH), or the Simple Network Management Protocol (SNMP). The OASIS® Structured Threat Information eXpression (STIX) is a natural way of describing the logging and alert data and is supported in the SilverlineRT system via the OASIS Trusted Automated Exchange of Intelligence Information (TAXII) transport. In this way, the SilverlineRT system may leverage future/third-party advances in detection algorithms.

The analytic server 102 may build a SilverlineRT application 116 by using an attack tree model based on a set of aggregation rules, which dictate how various metrics are computed in terms of lower-level data. In the SilverlineRT application 116, the analytic server 102 may support a large set of aggregation functions, and the user can define custom functions if needed. The analytic server 102 may refine the interface for aggregation functions and provide a set of aggregators specific to assessing real-time cyber threat indicator data. The results of the aggregation rules can be in standard form such as National Institute of Standards and Technology (NIST) Common Vulnerability Scoring System (CVSS) vectors or costs, or in mission domain-specific terms. As data arrives, the metrics will be recomputed in real-time, "bubbling up" the tree as appropriate.

After the analytic server 102 prioritizes and analyzes the aggregate impact of multiple alters, IDS notifications, and other attack indicators, the analytic server 102 may display the results on a user interface of the analytic server or on a computing device (not shown) associated with the analyst 114. The analyst 114 may easily see which alerts have the most significant "big picture" impact and which can be triaged for later assessment by low-level personnel. When cost or other metrics are available within the model, the analyst 114 may see which proposed remediation strategies have the most significant impact for the least cost or least mission disruption.

The analytic server 102 may operate the SilverlineRT application 116 in a federal manner, where portions of the tree model located at various sites or administrative domains and are maintained by local experts. At alternate sites, headless copies of SilverlineRT applications aggregate site-local data and alerts; the results may provide aggregated inputs to one or more "master" instances for analyst use. Such an architecture may allow for voluminous, potentially sensitive alert and IDS data to stay local (e.g., for forensic purposes) while enabling the entire system to scale up for very large enterprises.

Overall, the analytic server 102 may use the SilverlineRT application 116 to help the analyst 114 sort out false alarms from true attacks that have minimal impact on mission success, and highlight the attacks that must be addressed immediately and possibly automatically. Therefore, the analytic server 102 may save time and reduce cognitive burden on overloaded security analysts.

The SilverlineRT application 116 built by the analytic server 102 may include several components or modules, such as an import/export module, an attack tree analysis module, an agent tests module, a graphical user interface module. The import/export module may receive data from or transmit data to local knowledge database 104. The import/export module may also receive logging and alert information from devices under management, such as the servers, endpoints, and network devices in the distributed systems and network 106 through a third-party IDS or SIEM 108. The agent tests module may receive events and alerts from the operating system of the infrastructure platform within the enterprise/distributed systems and network 106 or applications and servers within the operating system. In addition, the agent tests module may perform configuration tests and remote agent tests on the operating system of the infrastructure platform within the enterprise/distributed systems and network 106. The agent tests module may interact with the attack tree analysis module to determine and analyze the security attacks. The attack tree module may comprise a set of aggregation rules for computing various metrics on threats and possible attacks on different devices. The graphical user interface module may comprise graphical interactive elements configured to display analysis results and cyber threat indicator data, receive user configuration, and any other interactive elements that allow the user to interact with the analytic server 102.

The local knowledge database 104 may be any non-transitory machine-readable media associated with the analytic server 102. The local knowledge database 104 may be configured to store data, including logging and alert information from different devices and systems, the attack tree model comprising aggregation rules and configurations for analyzing security threats and attacks, the metrics computed based on the aggregation rules in the attack tree model, the ranking and prioritization of attack-related events. The local knowledge database 104 may also include any other data that is helpful for analyzing security alerts and server/endpoint/network events.

The enterprise/distributed systems and network 106 may be any number of devices and systems connected with each other within a distributed network. Such devices and systems may be under management of the analytic server 102. The enterprise/distributed systems and network 106 may comprise infrastructure platform with operating system for servers and applications. The operating system may receive remote agent tests from the analytic server 102. The infrastructure platform of one system may be connected to another system (e.g., a second system). The infrastructure platform of each system may transmit logging and alert information to the analytic server 102 via a third-party IDS or SIEM 108.

The third-party IDS or STEM 108 may be any device or software application that monitors a network or systems for malicious activity or policy violations. The security information and event management (SIEM) system may report any malicious activity or violation to an administrator or analyst. The SIEM may combine outputs from multiple sources. The third-party IDS or STEM 108 may plug in the existing systems, aggregate the alerts and events from various systems and devices and import the alerts and events into the SilverlineRT application 116 running on the analytic server 102.

The second analytic server 110 connected with the second network of distributed systems 112 may be a similar system architecture as the analytic server 102 connected with the enterprise/distributed systems and network 106. The different analytic servers may be in communication with each other and feed alerts and events information into each other. The system 100 may comprise any number of such analytic servers and connected networks of distributed systems.

Figure 2:
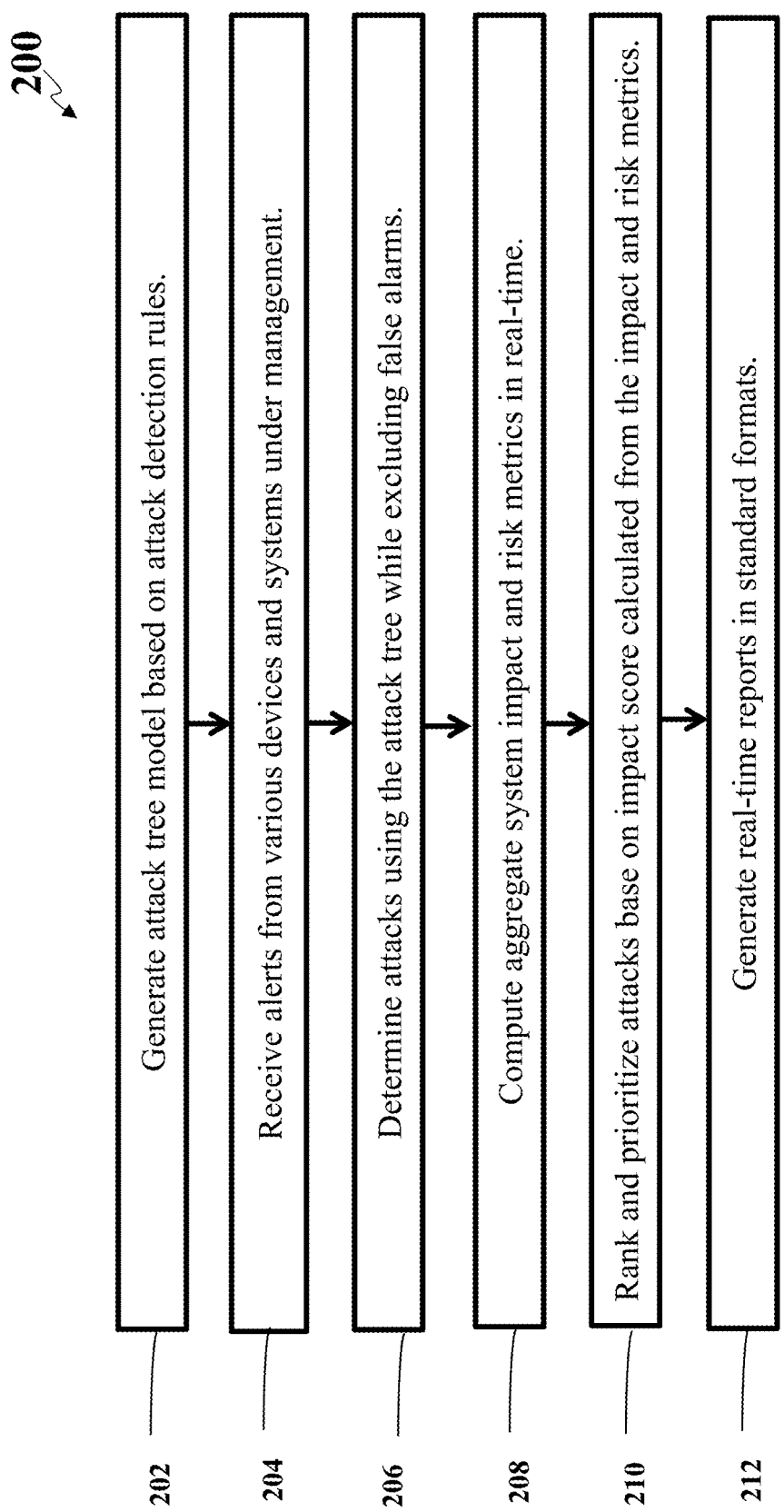
FIG. 2 illustrates a flowchart for improving the ranking and prioritization of attack-related events, according to an embodiment.

FIG. 2 illustrates a flowchart for improving the ranking and prioritization of attack-related events 200, according to an embodiment. Other embodiments may comprise additional or alternative steps, or may omit some steps altogether.

Figure 3:
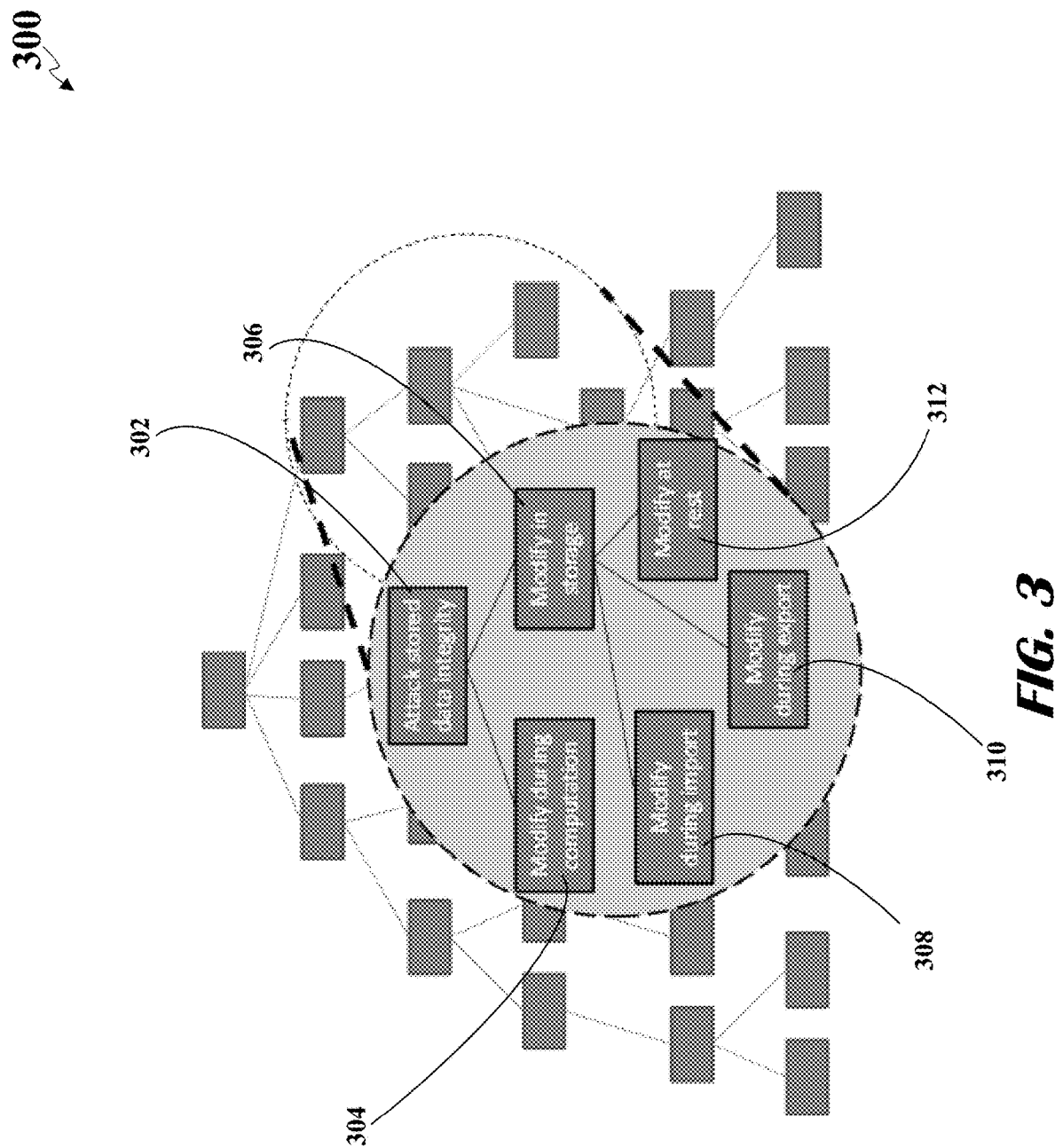
FIG. 3 illustrates an example of an attack tree, according to an embodiment.
Figure 4:
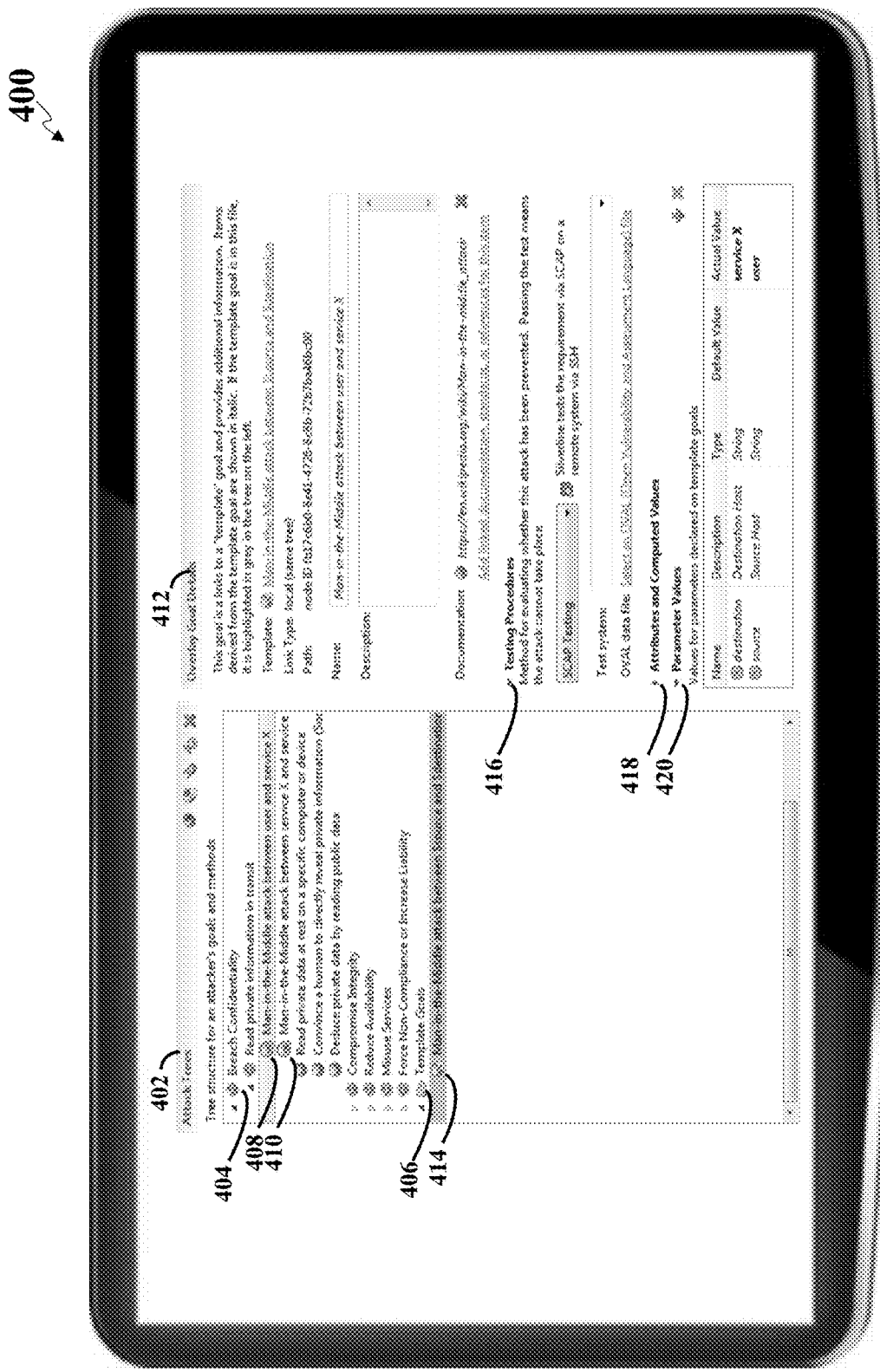
FIG. 4 illustrates an example of a user interface for an attack tree model in SiverlineRT, according to an embodiment.

At step 202, the analytic server may generate an attack tree model based on attack detection rules. The attack tree model may be an executable logic for detecting attacks. The attack detection rules may be from user configuration and/or local knowledge in the database. The analytic server may build the attack tree based on a set of aggregation rules and other attack detection rules, which dictate how various metrics are computed in terms of lower-level data. The analytic server may support a large set of aggregation functions and attack detection rules. In some embodiments, the analytic server may provide a graphical user interface (GUI) for the analyst/user to define customer functions and rules. FIG. 4 illustrates an example of a user interface for managing the attack tree. By interacting with the user interface, the analyst may be able to associate different metadata, various attributes with items of the attack tree and test the systems in various ways. In some other embodiments, the analytic server may retrieve the functions and rules from the local knowledge database. Based on the aggregation rules and attack detection rules, the analytic server may generate the attack tree model that shows how a large system can be attacked, and describes threats on computer systems and possible attacks to realize those threats. FIG. 3 illustrates an example of attack tree model. The analytic server may also update the attack tree model as results are available.

At step 204, the analytic server may monitor systems and receive electronic notifications of alerts from various devices and systems under management in real-time. The analytic server may monitor a set of devices and systems with any number of devices connected with each other within a distributed network. For example, the analytic server may monitor a network with multiple heterogeneous systems by receiving alerts from external sensors and intrusion detection systems. Such devices and systems may be under management of the analytic server. The analytic server may receive logging and alert information from the infrastructure platform of the distributed systems and network via a third-party IDS or STEM. The third-party IDS or SIEM may plug in the existing systems, aggregate the alerts and events from various systems and devices and import the alerts and events into the analytic server.

At step 206, the analytic server may detect attacks using the attack tree while excluding false alarms. Based on the logging information, alerts, events received from various devices and systems under management, the analytic server may determine attacks by executing the logic of the attack tree model. Specifically, the analytic server may follow the logic of the attack tree model by traversing the attack tree model from bottom up and determine if the logging information, alerts and events data satisfy the operating conditions of the nodes. From the bottom up, child nodes are lower-level operating conditions of an attack, at least one of the child nodes must be satisfied to make the direct parent node true, the parent node may represent higher-level operating condition; when the root is satisfied (e.g., the highest level operating condition is satisfied), the attack is complete. The analytic server may perform automated evaluations and computations over the attack tree model, testing on-line to see whether particulate vulnerabilities are present or known-weak configurations or libraries are in use. In addition, by correlating information from multiple sources, the analytic server may be able to learn context for alerts and distinguish likely false alarms, as well as true, but unimportant, alerts. Thus, the analytic server may reduce false positives and cognitive load the false positives may cause.

At step 208, the analytic server may compute aggregate system impact and risk metrics in real-time. The analytic server may correlate context and configuration data from disparate servers, endpoints, and network sensors and determine overall system risk. The analytic server may not only determine if the combination of correlated data indicates an attack, but also how much of an impact the attack might have. For example, the analytic server may determine various security-relevant metrics for the mission system as a whole, such as impact, potential for loss of life, remediation cost, and the like. As data arrives, the analytic server may re-compute the metrics in real-time. The analytic server may develop aggregation modules for the SilverlineRT system's hierarchical model to compute (or update) impact metrics in terms of lower-level alerts and indicators from server, endpoint, and network sensors or intrusion detection systems. The SilverlineRT system's hierarchical system model may provide computed scores, such as Common Vulnerability Scoring System (CVSS) scores, to rank indicators and alerts.

At step 210, the analytic server may rank and prioritize the attacks based on an impact score calculated from the impact and risk metrics and display the attacks based on the ranking. After determining a set of impact and risk metrics from multiple data sources, the analytic server may calculate aggregated metrics (e.g., CVSS vectors) from base data. For example, the analytic server may calculate an impact score (e.g., CVSS score) based on the impact and risk metrics. The Common Vulnerability Scoring System (CVSS) is a free and open industry standard for assessing the severity of computer system security vulnerabilities. CVSS attempts to assign severity scores to vulnerabilities, allowing responders to prioritize responses and resources according to threat. Scores are calculated based on a formula that depends on several metrics that approximate ease of exploit and the impact of exploit.

The analytic server may use aggregation functions to define how metrics at a single level of the attack tree model are computed in terms of metrics from the next level down. For example, a CVSS "impact" score for a set of servers may be the maximum CVSS impact value for all constituent servers. While the SilverlineRT system allows arbitrary aggregation functions to be defined, the analytic server may provide support for customizing the user interface to facilitate the definition of aggregation rules common in real-time intrusion alert systems. These rules may serve to correlate sensor data from servers, endpoints, network devices, and existing IDS in a mission/system-specific manner. Such a feature may give added value to SilverlineRT system's models: by knowing the context of an alert, the system may compute the impact to overall mission success.

The analytic server may rank attack indicators and alerts based on the CVSS scores and display the attacks on a user interface based on the ranking. The analytic server may show the context and impacts of alert on the user interface. As a result, the analyst may easily see which alters have the most significant "big picture" impact and which can be triaged for later assessment by low-level personnel. When cost or other metrics are available within the model, the analyst can easily see which proposed remediation strategies have the most significant impact for the least cost or least mission disruption. Thus, the SilverlineRT system may help triage unimportant issues from critical ones, save time and mental effort by subject matter experts (SME), maximize the effectiveness of limited SME time in real-time monitoring high value IT assets.

Figure 5:
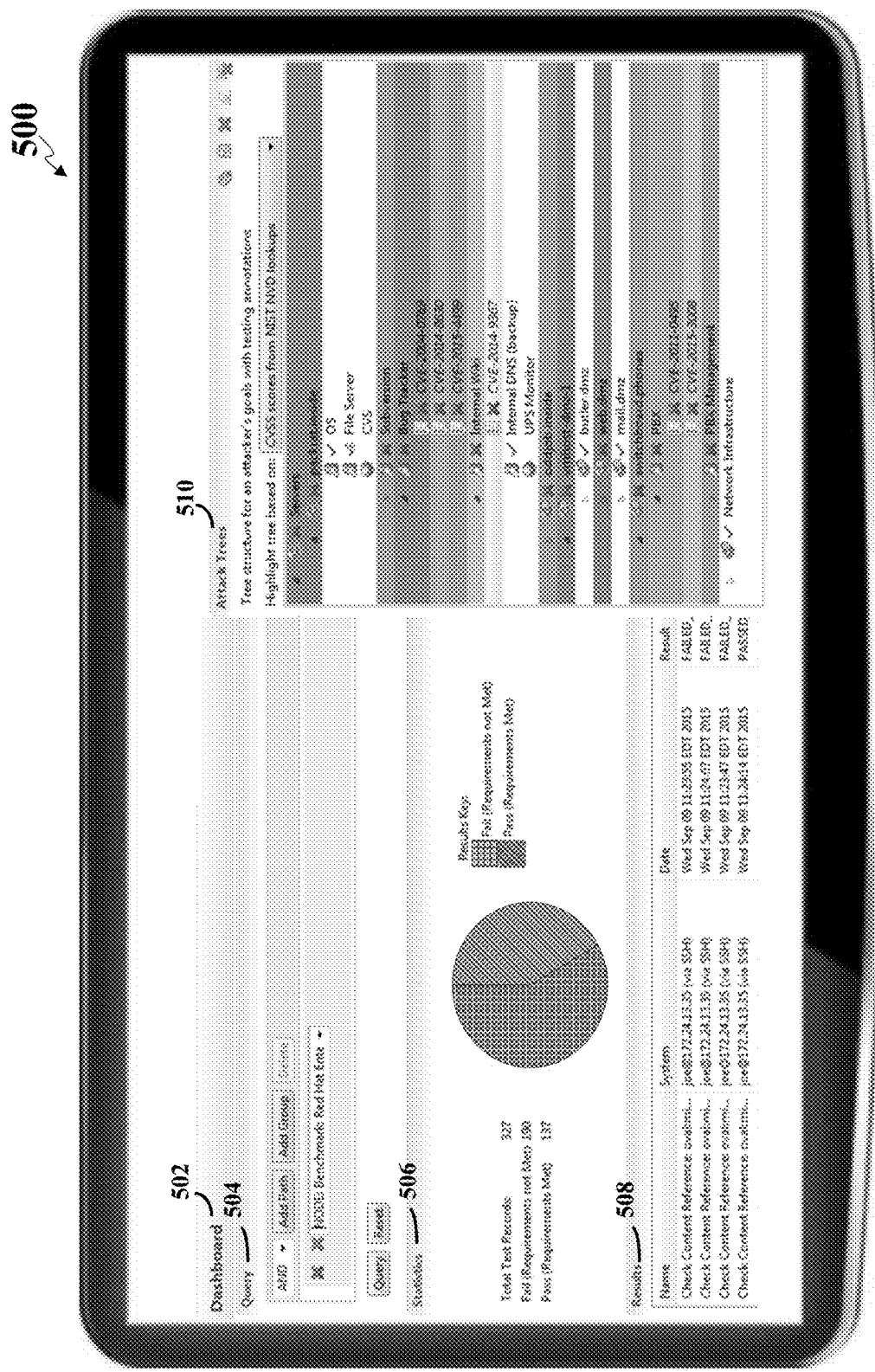
FIG. 5 illustrates an example of a user interface for test records and attack reports, according to an embodiment.

At step 212, the analytic server may generate in real-time reports in standard formats. The analytic server may display the report in a dashboard of a user interface. The dashboard may comprise the prioritized list of the attacks. The SilverlineRT system may be able to produce machine-readable alerts and human-readable reports to fit within an organization's cybersecurity ecosystem. The analytic server may support visualization and Portable Document Format (PDF) report-generation capabilities in the SilverlineRT system. FIG. 5 illustrates an example of a user interface for test records and attack reports. The analytic server may support generating alters via syslog, email, and STIX+TAXII (Structured Threat Information Expression+Trusted Automated Exchange of Indicator Information) when analyst-defined conditions occur (e.g., a high-impact attack found with a particular likelihood). In responding to alerts, the analyst may bring up their copy of a SilverlineRT application to examine visualizations or drill deeper into the indicators of compromise. Email alerts may include a PDF report with detailed visualizations as an attachment. These alerts may occur in real-time, as data comes in and computed metrics exceed thresholds.

As with data importers, the analytic server may define a plug-in application programming interface (API) for generating alerts in arbitrary formats. The API may also be used to perform automated remediation or other actions in response to a suitably severe alert; the API may provide the automated response algorithm with information on the expected impact or disruption, both of which are critical in deciding whether to take automated action. In some embodiments, the analytic server may automatically respond to one or more higher priority attacks. As a result, the analytic server may lay the groundwork for automated response.

Internally, the analytic server may use straightforward Extensible Markup Language (XML) for data storage and processing and keep raw data in its native formats for forensic purposes. By combining such features, the analytic server may facilitate integration with other data processing tools. For instance, one could write an Extensible Stylesheet Language Transformations (XSLT) script that generates Hypertext Markup Language (HTML) reports from the SilverlineRT system test records.

FIG. 3 illustrates an example of an attack tree 300, according to an embodiment. The attack tree model may show how an adversary's aims can be achieved in terms of sub-goals and system configuration choices. The attack tree may be a multi-level diagram consisting of one root, leaves, and children. From the bottom up, child nodes are conditions, which must be satisfied to make the direct parent node true; when the root is satisfied, the attack is complete. Each node may be satisfied only by its direct child nodes. A node may be the child of another node; in such a case, it becomes logical that multiple steps must be taken to carry out an attack. FIG. 3 shows an excerpt of a high-level attack tree that describes an attack on data integrity; all children shown in the excerpt may be disjunctive. The attack on data integrity may comprise attack on stored data integrity 302 and attack on other data integrity. The data may be modified either during computation 304 or in persistent storage 306. The stored data may be modified during import 308, during export 310, or when it not being actively used 312. The children of each of these nodes may detail specific ways those modifications could happen.

FIG. 4 illustrates an example of a user interface 400 for an attack tree model in a SiverlineRT system, according to an embodiment. The example may be an excerpt of the attack tree model in the SilverlineRT system, including some features for managing large tree models. The SilverlineRT system may comprise natural description of mission-critical system properties in terms of components/servers/endpoints and individual configuration items, alerts, and other attack indications. The SilverlineRT system may support real-time monitoring of distributed applications, specifically, modeling and simulation applications for the Missile Defense Agency (MDA). The modeling and simulation systems may help analysts monitor large-scale systems and find individual nodes that are not operating as expected, either due to attack or hardware/software failure.

As shown in FIG. 4, the attack trees 402 may comprise breach confidentiality, compromised integrity, reduce availability, misuse services, force non-compliance or increase liability, etc. Although the attack trees are in a directory structure, the SilverlineRT system may also show a traditional boxes-and-arrows tree diagram, similar to FIG. 3. In the example of breach confidentiality 404, the breach confidentiality may require reading private information in transit, or reading private data at rest, or convincing a human to directly reveal private information, or deduce private data by reading public data, etc. In order to make it possible to model large systems, the SilverlineRT system may have templates for common things that occur in the attack tree, like a man-in-the-middle attack in this particular example. The template of man-in-the-middle attack may allow an analyst to review and configure the related information. For example, the template of man-in-the middle attack between source and destination 414 under template goals 406 may have two different cases: man-in-the-middle attack between user and service X 408 and man-in-the-middle attack between service X and service Y 410. Once the analyst selects the case of man-in-the-middle attack between user and service X 408, the analytic server may display the user interface overlay goal details 412. The displayed overlay goal details 412 may comprise various information about the template including template identifier, link type, path, name, description and documentation. The documentation may be a Wikipedia link. The overlay goal details 412 may also comprise user interfaces of testing procedures 416, attributes and computed values 418, parameter values 420. By interacting with such user interfaces, the analyst may be able to associate different metadata, various attributes with items of the attack tree and test the systems in various ways.

FIG. 5 illustrates an example of a user interface for test records and attack reports 500, according to an embodiment. The user interface for test records may include a dashboard 502 that displays the elements of query 504, statistics 506, and results 508. The element of query 504 may allow the analyst to issue a specific test query. The element of statistics 506 may display the test result statistics, such as the total test records, failed records, and pass records. The element of results 508 may display detailed test information on each record, such as the name, system, date, and test result (e.g., failed or passed). The user interface for attack reports may display the attack report as attack trees 510. For example, the attack reports may be in a tree structure with highlighted items based on the CVSS scores. In some embodiments, the analytic server may highlight the attacks or threats with different colors based on the CVSS scores. For example, attacks or threats with high CVSS scores may be highlighted in a red warning, attacks and threats with medium CVSS scores may be highlighted in an orange warning, and attacks and threats with low CVSS scores may be highlighted in a yellow warning.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   receiving, by a computer, a plurality of notifications from a plurality of network devices monitoring a network infrastructure;
   detecting, by the computer, one or more attacks on the network infrastructure by executing an attack tree model on the plurality of notifications;

calculating, by the computer, at least one metric value for each detected attack according to each network device that generated the one or more notifications;

calculating, by the computer, an impact score for each detected attack using the at least one metric value calculated for the respective attack; and generating, by the computer, one or more graphical user interface (GUIs) configured to display each impact score for the one or more detected attacks, wherein the one or more GUIs displays a report indicating that an impact score for at least one detected attack satisfies a threshold value.

2. The method according to claim 1, wherein generating the one or more GUIs further comprises:

comparing, by the computer, a value of each respective impact score of the one or more detected attacks, wherein the one or more GUIs is further configured to display the one or more detected attacks according to each comparative value.

3. The method according to claim 1, wherein the at least one metric for each detected attack is calculated based upon the attack tree model, the attack tree model having aggregation rules for determining a metric for a notification based upon a network device that generated the notification.

4. The method according to claim 3, wherein each impact score for each detected attack is calculated based upon the aggregation rules of the attack tree model, the aggregation rules indicating a comparative impact value for each detected attack based upon each network device that generated each notification.

5. The method according to claim 1, further comprising generating, by a computer, the attack tree model based upon a plurality of rules.

6. The method according to claim 5, wherein a rule is at least one of an aggregation rule and an attack detection rule.

7. The method according to claim 5, further comprising receiving, by the computer, one or more rules from at least one of user configuration inputs and a local database.

8. The method according to claim 1, further comprising generating, by the computer, an overall risk score for the network infrastructure based upon aggregation rules configured to correlate at least one of context data and configuration data associated with each network device.

9. The method according to claim 1, further comprising:

receiving, by the computer, a plurality of updated notifications from the plurality of network devices; and recalculating, by the computer, the impact score for each detected attack based upon the updated notifications.

10. A system comprising:

an analytic server comprising one or more processors and memory, the analytic server configured to:

receive a plurality of notifications from a plurality of network devices configured to monitor a network infrastructure;

detect one or more attacks on the network infrastructure by executing an attack tree model on the plurality of notifications;

calculate at least one metric value for each detected attack according to each network device that generated the one or more notifications;

calculate an impact score for each detected attack using the at least one metric value calculated for the respective attack; and generate one or more graphical user interface (GUIs) configured to display each impact score for the one or more detected attacks, wherein the one or more GUIs displays a report indicating that an impact score for at least one detected attack satisfies a threshold value.

11. The system according to claim 10, wherein to generate the one or more GUIs the analytic server is further configured to:

compare a value of each respective impact score of the one or more detected attacks, wherein the one or more GUIs is further configured to display the one or more detected attacks according to each comparative value.

12. The system according to claim 10, wherein the analytic server is configured to calculate the at least one metric for each detected attack based upon the attack tree model, the attack tree model having aggregation rules for determining a metric for a notification based upon a network device that generated the notification.

13. The system according to claim 12, wherein the analytic server is configured to calculate each impact score for each detected attack based upon the aggregation rules of the attack tree model, the aggregation rules indicating a comparative impact value for each detected attack based upon each network device that generated each notification.

14. The system according to claim 10, wherein the analytic server is further configured to generate the attack tree model based upon a plurality of rules.

15. The system according to claim 14, wherein a rule is at least one of an aggregation rule and an attack detection rule.

16. The system according to claim 14, wherein the analytic server is further configured to receive one or more rules from at least one of user configuration inputs and a local database.

17. The system according to claim 10, wherein the analytic server is further configured to generate an overall risk score for the network infrastructure based upon aggregation rules that correlate at least one of context data and configuration data associated with each network device.

18. The system according to claim 10, wherein the analytic server is further configured to:

receive a plurality of updated notifications from the plurality of network devices; and recalculate the impact score for each detected attack based upon the updated notifications.

* * * * *